Dec. 25, 1928.  K. E. LYMAN  1,696,314
BRAKE MECHANISM
Filed May 5, 1927
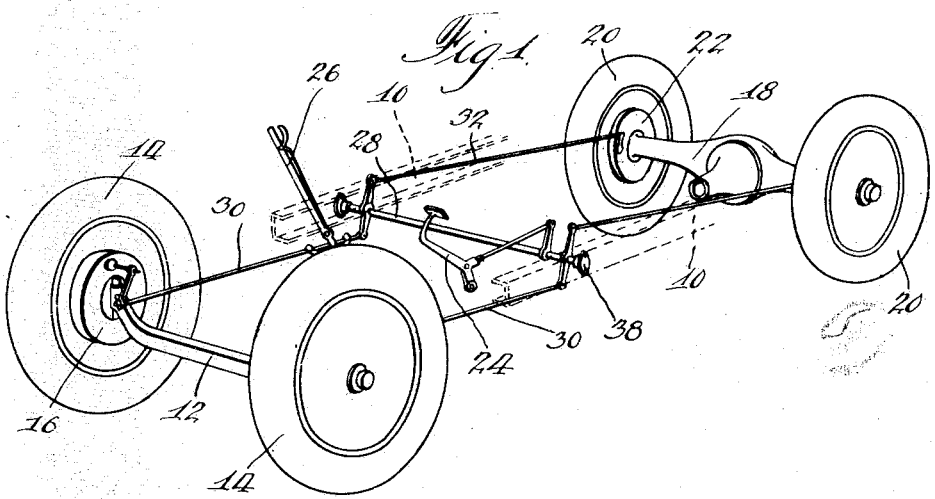
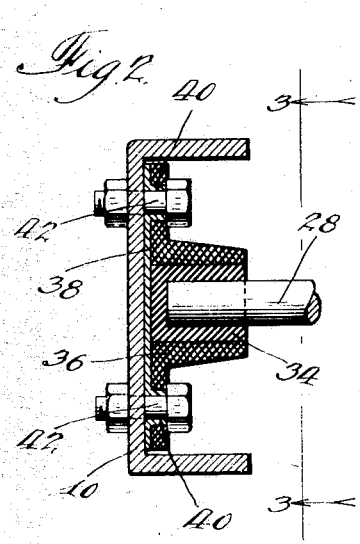
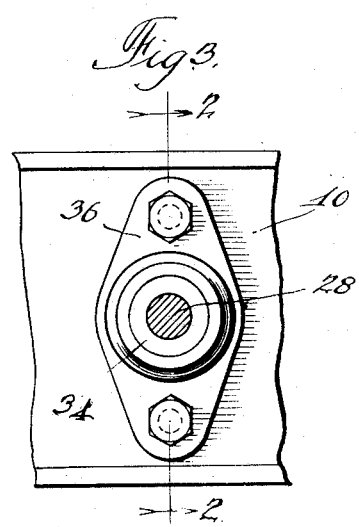

Patented Dec. 25, 1928.

1,696,314

UNITED STATES PATENT OFFICE.

KENNETH E. LYMAN, OF CHICAGO, ILLINOIS, ASSIGNOR TO BENDIX BRAKE COMPANY, OF CHICAGO, ILLINOIS, A CORPORATION OF ILLINOIS.

BRAKE MECHANISM.

Application filed May 5, 1927. Serial No. 188,978.

This invention relates to supports for shafts, and is illustrated as embodied in four-wheel brake mechanism for an automobile. An object of the invention is to provide a simple and inexpensive bearing for the shaft, preferably of rubber or analogous material, which will permit the shaft to shift slightly crosswise of its axis, thus in the case of the illustrated brake mechanism balancing the pressures on the front and rear brakes.

I prefer to bond the bearing material directly to the shaft, for example by vulcanization, so that the bearing serves the additional function of a return spring, in resisting angular movement of the shaft.

The illustrated bearing is made up as a unit intended to be mounted permanently on the shaft end. It comprises a novel metal back, adapted to be bolted or otherwise secured to a chassis frame, and carrying a hard rubber outer portion provided with a soft rubber center portion or bushing bonded to the shaft.

The above and other objects and features of the invention, including various novel combinations of parts and desirable particular constructions, will be apparent from the following description of the illustrative embodiment shown in the accompanying drawing, in which:

Figure 1 is a perspective view of the principal parts of an automobile chassis, showing the brake mechanism;

Figure 2 is a cross section through the support at one end of the shaft; and

Figure 3 is a view looking in the direction of the arrows 3—3 in Figure 2, and showing the shaft support in side elevation.

The illustrated automobile chassis includes a frame 10, supported (through the usual springs) on a front axle 12 having wheels 14 with brakes 16, and on a rear axle 18 having wheels 20 with brakes 22. All four brakes are operated, by means of a foot pedal 24, or by a hand lever 26, by a single rockshaft 28 extending crosswise of the chassis and connected to the front brakes by the usual rods 30 and to the rear brakes by the brake rods 32.

According to an important feature of the present invention, there are vulcanized, or otherwise bonded or secured, to the ends of shaft 28 bearings or bushings of elastic material such as rubber, each herein shown as a soft-rubber central portion 34 carried by a hard rubber outer portion or support 36 carried by, and preferably bonded to, a novel pressed-metal back 38 shown as having embedded in portion 36, tubular bosses 40 for the attaching bolts 42 securing the bearing to the chassis frame.

While portions 34 and 36 are shown as sharply differentiated, they will ordinarily be molded together before vulcanization, and will to some extent merge gradually into one another.

The soft-rubber bearings or bushings 34 thus have three functions: (1) They serve as bearings for the shaft ends; (2) they act after the manner of return springs to resist angular movement of the shaft; and (3) they permit the shaft ends to shift slightly crosswise, to balance the pressures on the corresponding front and rear brakes.

While one illustrative embodiment has been described in detail, it is not my intention to limit the scope of the invention to that particular embodiment, or otherwise than by the terms of the appended claims.

I claim:

1. Operating means comprising, in combination, a relatively long rockshaft, a support adjacent the end of the rockshaft, and rubber material bonded to the shaft and to the support and having the double function of serving as a bearing for the shaft and of yieldingly resisting angular movement of the shaft.

2. Operating means comprising, in combination, a rockshaft, an adjacent support, and rubber material bonded to the shaft and to the support and having the double function of serving as a bearing for the shaft and of yieldingly resisting angular movement of the shaft, the rubber material having a soft rubber portion embracing the shaft and a hard rubber portion surrounding and supporting the soft portion.

3. Operating means comprising a shaft, and a support for the end of the shaft including a metal back, and a rubber bearing secured to the back and bonded to the shaft end and yieldingly resisting angular movement of the shaft and also permitting the shaft end to have a slight equalizing movement crosswise of its axis.

4. Operating means comprising a shaft, and a support for the end of the shaft including a metal back, and a rubber bearing secured to the back and including a hard rubber outer portion and a soft rubber central portion secured to the shaft end and yieldingly resisting angular movement of the shaft and also permitting the shaft end to have a slight equalizing movement crosswise of its axis.

5. Brake mechanism comprising front and rear sets of brakes and, in combination therewith, a single cross-shaft connected at each end to the front and rear brakes on that side of the car, and rubber bearings for the ends of the shaft permittingg either of said ends to shift slightly crosswise of its axis to balance the pressures on the corresponding front and rear brakes.

6. Brake mechanism comprising front and rear sets of brakes and, in combination therewith, a single cross-shaft connected at each end to the front and rear brakes on that side of the car, and rubber bearings for the ends of the shaft permitting either of said ends to shift slightly crosswise of its axis to balance the pressures on the corresponding front and rear brakes, said bearings being secured to the shaft ends and resisting angular movement thereof.

7. A shaft support comprising, in combination, a metal back formed with integral tubular bosses for attaching bolts, a hard rubber outer portion in which said bosses are embedded, and a soft rubber central bushing adapted to receive the shaft end and which is surrounded and supported by the hard rubber portion.

8. A shaft support comprising, in combination, a matal back formed with integral tubular bosses for attaching bolts, a hard rubber outer portion in which said bosses are embedded and which is bonded to said back, and a soft rubber central bushing adapted to receive and be bonded to the shaft end and which is surrounded and supported by the hard rubber portion.

In testimony whereof, I have hereunto signed my name.

KENNETH E. LYMAN.